(12) United States Patent
Hosotani

(10) Patent No.: US 9,071,148 B2
(45) Date of Patent: Jun. 30, 2015

(54) SWITCHING CONTROL CIRCUIT AND SWITCHING POWER SUPPLY APPARATUS INCLUDING STANDBY MODE SETTING MECHANISM

(71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 158 days.

(21) Appl. No.: 13/740,363

(22) Filed: Jan. 14, 2013

(65) Prior Publication Data

US 2013/0128623 A1    May 23, 2013

Related U.S. Application Data

(63) Continuation of application No. PCT/JP2011/057095, filed on Mar. 24, 2011.

(30) Foreign Application Priority Data

Jul. 26, 2010    (JP) .................................. 2010-166692

(51) Int. Cl.
G05F 1/00    (2006.01)
H02M 3/335    (2006.01)
H02M 1/00    (2007.01)

(52) U.S. Cl.
CPC ...... *H02M 3/33507* (2013.01); *H02M 3/33523* (2013.01); *H02M 3/33569* (2013.01); *H02M 2001/0032* (2013.01); *Y02B 70/16* (2013.01)

(58) Field of Classification Search
USPC .......... 363/21.04, 21.05, 21.07, 21.08, 21.09, 363/21.1, 21.11, 21.12, 21.13, 21.15, 21.16, 363/21.17, 21.18; 323/282–285
See application file for complete search history.

(56) References Cited

U.S. PATENT DOCUMENTS 4,823,070 A    4/1989    Nelson
6,061,257 A    5/2000    Spampinato et al.
(Continued)

FOREIGN PATENT DOCUMENTS

CN    101677216 A    3/2010
DE    102 55 110 A1    8/2003
(Continued)

OTHER PUBLICATIONS

Official Communication issued in International Patent Application No. PCT/JP2011/057095, mailed on Jun. 28, 2011.
(Continued)

*Primary Examiner* — Jeffrey Gblende
(74) *Attorney, Agent, or Firm* — Keating & Bennett, LLP

(57) ABSTRACT

An external circuit is connected to a polarity detection terminal of a switching control IC. An increased value of the voltage of a pulse signal input to the polarity detection terminal at the time of the activation of a power supply changes in response to this external circuit. Accordingly, owing to the external circuit connected to the polarity detection terminal, the validity/invalidity of a standby mode is set. When the standby mode is validated, a blanking frequency changes in response to the voltage of a feedback terminal, and a switching loss in a light load is reduced. Accordingly, a switching control circuit and a switching power supply apparatus are configured that are able to set the validity/invalidity of the standby mode or select the method of the standby mode without using a dedicated terminal.

12 Claims, 13 Drawing Sheets

(56) References Cited

U.S. PATENT DOCUMENTS

| | | | |
|---|---|---|---|
| 6,094,039 | A | 7/2000 | Farrenkopf |
| 7,679,412 | B2 * | 3/2010 | Ogiwara et al. ............ 327/143 |
| 2003/0128485 | A1 | 7/2003 | Matsumoto |
| 2006/0132997 | A1 | 6/2006 | Chu et al. |
| 2007/0007936 | A1 | 1/2007 | Hiasa |
| 2007/0046294 | A1 | 3/2007 | Matthews et al. |
| 2007/0103949 | A1 * | 5/2007 | Tsuruya ..................... 363/125 |
| 2007/0216372 | A1 * | 9/2007 | Weng et al. ................. 323/222 |
| 2007/0253228 | A1 * | 11/2007 | Morota et al. ............ 363/21.12 |
| 2008/0084712 | A1 | 4/2008 | Wang et al. |
| 2008/0219033 | A1 * | 9/2008 | Nishikawa ............... 363/21.16 |
| 2008/0291702 | A1 * | 11/2008 | Hosotani .................. 363/21.02 |
| 2009/0218999 | A1 | 9/2009 | Kikuchi |
| 2009/0219002 | A1 * | 9/2009 | Shirai et al. ................ 323/282 |
| 2010/0073041 | A1 | 3/2010 | Djenguerian et al. |
| 2010/0148733 | A1 * | 6/2010 | Koeppl et al. .............. 323/225 |
| 2010/0321039 | A1 | 12/2010 | Matthews et al. |
| 2011/0175587 | A1 | 7/2011 | Hosotani |
| 2012/0049823 | A1 | 3/2012 | Chen |
| 2012/0320639 | A1 | 12/2012 | Djenguerian et al. |
| 2014/0022825 | A1 | 1/2014 | Djenguerian et al. |

FOREIGN PATENT DOCUMENTS

| | | |
|---|---|---|
| DE | 10 2011 008 251 A1 | 7/2011 |
| JP | 6-209572 A | 7/1994 |
| JP | 2001-245471 A | 9/2001 |
| JP | 2004-229428 A | 8/2004 |
| JP | 2007-14081 A | 1/2007 |
| JP | 2007-73954 A | 3/2007 |
| JP | 2007-215316 A | 8/2007 |
| JP | 2009-213228 A | 9/2009 |
| JP | 2010-75044 A | 4/2010 |
| WO | 2010/104172 A1 | 9/2010 |

OTHER PUBLICATIONS

Official Communication issued in corresponding German Patent Application No. 11 2011 102 488.6, mailed on Apr. 10, 2014.

Official Communication issued in corresponding Chinese Patent Application No. 201180031872.9, mailed on Aug. 5, 2014.

* cited by examiner

SWITCHING CONTROL CIRCUIT AND SWITCHING POWER SUPPLY APPARATUS INCLUDING STANDBY MODE SETTING MECHANISM

BACKGROUND OF THE INVENTION

1. Field of the Invention

The present invention relates to a switching control circuit that is integrated circuit-compatible and preferably for use in a switching power supply apparatus, and a switching power supply apparatus including such a switching control circuit.

2. Description of the Related Art

In a switching power supply apparatus, a switching control IC includes circuits used for realizing various kinds of functions such as output control, activation, overcurrent protection, overvoltage protection, standby, and power factor improvement. By these functions being increased, the enhanced functionality of a switching control IC is promoted.

In order for each function of the switching control IC to be set so as to be compatible with the operation specification of an application, a plurality of terminals used for an interface with an external circuit are necessary for each function. Therefore, when the number of incorporated functions increases, the number of terminals increases naturally. When the number of terminals increases, the package of the switching control IC becomes large, which leads to an increase in the cost unit price of an IC.

For example, a switching power supply control IC having a normal-time operation mode and a standby-time operation mode is disclosed in Japanese Unexamined Patent Application Publication No. 2007-14081.

FIG. 1 is the circuit diagram of the switching power supply control IC disclosed in Japanese Unexamined Patent Application Publication No. 2007-14081. A manual switching/automatic switching selection signal input terminal ATSTB, a MODE terminal, a SEL unit (comparator), an AUTOH unit (automatic switching circuit), an AUTOL unit (automatic switching circuit), and various kinds of gate circuits NOT1, NAND1, NAND2, OR2, NOR1, NOR2, an NchMOSFET (MN1), and the like are included.

A manual switching/automatic switching determination circuit is configured by the SEL-unit comparator and a threshold voltage VTH_SEL within the control IC, and a comparator output signal is output to the NAND1 and the OR2. The outputs of the NAND1 and the OR2 are input to the NAND2, and become a signal for driving the gate of the NchMOSFET (MN1). In other words, when an ATSTB terminal voltage is higher than the VTH_SEL, a High or Low signal corresponding to a STB terminal emerges in the output of the NAND2, and on the contrary, when the ATSTB terminal voltage is lower than the VTH_SEL, a signal emerges that is obtained by combining the outputs of an AUTOH into which an FB terminal voltage is input and an AUTOL owing to the NOR1. The AUTOH and AUTOL are automatic switching circuits, and include threshold voltages VTH_H and VTH_L and the gates NOR1 and NOR2.

A circuit including an internal power supply VDD, the MN1, a constant current source connected to the drain terminal of the MN1, and the MODE terminal is an operation-delay circuit, and a delay-time setting capacitor is connected to the MODE terminal. When the output of the NAND2 is High, the MODE terminal is fixed to GND owing to the MN1, and in the normal-time operation mode. By an NAND2 output being inverted and the MN1 being turned off, charge is performed on the capacitor connected to the terminal, using a constant current, and a delay time is generated. When a MODE terminal voltage has increased and become High, an OnTB-unit signal of an OR1 output, which specifies a burst operation, is input to the AND1 and combined with a PWM signal, and the standby-time operation mode where a burst switching operation is performed is set.

In the switching power supply control IC illustrated in FIG. 1, the manual switching/automatic switching selection signal input terminal ATSTB is necessary in order to perform selection of a standby mode, and it is difficult to set the validity/invalidity of the standby mode without an increase in the number of terminals.

SUMMARY OF THE INVENTION

Preferred embodiments of the present invention provide a switching control circuit and a switching power supply apparatus, which are able to set a validity/invalidity of a standby mode or select a method of the standby mode without using a dedicated terminal.

A switching control circuit according to a preferred embodiment of the present invention includes a semiconductor integrated circuit including a plurality of external terminals and configured to be provided in a power converter circuit of a switching power supply apparatus to control a switching element, wherein the plurality of external terminals include a polarity detection terminal, into which a polarity inversion timing signal indicating a change in a polarity of a current flowing through or a voltage generated in an inductor or a transformer of the power converter circuit due to an operation of the switching control circuit is input, and a feedback terminal into which a feedback signal used to detect and control an output voltage obtained due to an operation of the switching control circuit is input, a switching element control mechanism configured to perform switching control of the switching element based on a signal of the polarity detection terminal and a voltage of the feedback terminal, a control mode switching mechanism configured to switch between a control mode of the switching element when a load of the power converter circuit is in a standby state and a control mode of the switching element when the load is in a normal load state, and a standby mode setting mechanism configured to detect, as a determination target signal, a voltage induced in an external circuit that is connected to the polarity detection terminal or the feedback terminal and includes at least a resistance element or a semiconductor element, and to set the validity/invalidity of a control mode switched when the control mode switching mechanism is in the standby state or a type of a control mode in a standby state, in response to the determination target signal in a predetermined detection time period in which the determination target signal is detected.

The switching element control mechanism preferably forcibly sets a switching frequency of the switching element lower than a switching frequency in the normal load state, for example, in the control mode (standby mode) in the standby state.

The switching element control mechanism preferably restricts a maximum level of the switching frequency, for example, in the control mode (standby mode) in the normal load state.

The switching element control mechanism preferably performs intermittent oscillation driving where an oscillation time period and a halt time period in the switching element is alternately repeated, for example, in the control mode (standby mode) in the normal load state.

The standby mode setting mechanism preferably sets the validity/invalidity of the control mode (standby mode) in the standby state or the type of the control mode in the standby state by comparing a voltage of the polarity detection terminal with a threshold voltage, for example, in the detection time period.

The standby mode setting mechanism preferably sets the validity/invalidity of the control mode (standby mode) in the standby state or the type of the control mode in the standby state by comparing a voltage of the feedback terminal with a threshold voltage, for example, in the detection time period.

The standby mode setting mechanism preferably sets the validity/invalidity of the control mode (standby mode) in the standby state or the type of the control mode in the standby state on the basis of the number of pulses that are greater than or equal to a predetermined voltage and occur in the polarity detection terminal, for example, in the detection time period.

The start of the detection time period preferably is, for example, a time when a power-supply voltage input to the switching control circuit becomes greater than or equal to a predetermined voltage and the switching element control mechanism starts outputting a control signal.

The termination of the detection time period is, for example, a time when the voltage of the feedback terminal becomes less than or equal to a predetermined voltage.

The control mode switching mechanism detects, for example, that a power-supply voltage input to the switching control circuit has become less than a predetermined voltage, and cancels setting of the mode.

In addition, the plural external terminals include a control terminal (Brown-out terminal) into which a control signal for starting or halting the operation of the switching control circuit, and the control mode switching mechanism detects, for example, that a voltage of the control terminal has become a voltage halting the operation of the switching control circuit, and cancels setting of the mode.

A switching power supply apparatus of the present invention is a switching power supply apparatus where one of the switching control circuits described above is provided in the power converter circuit.

According to the present invention, since it is possible to set the validity/invalidity of a standby mode or select the method of the standby mode without using a dedicated terminal, it is possible to configure a switching control circuit where the number of terminals of a switching control IC does not increase and it is possible to effectively utilize the standby mode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
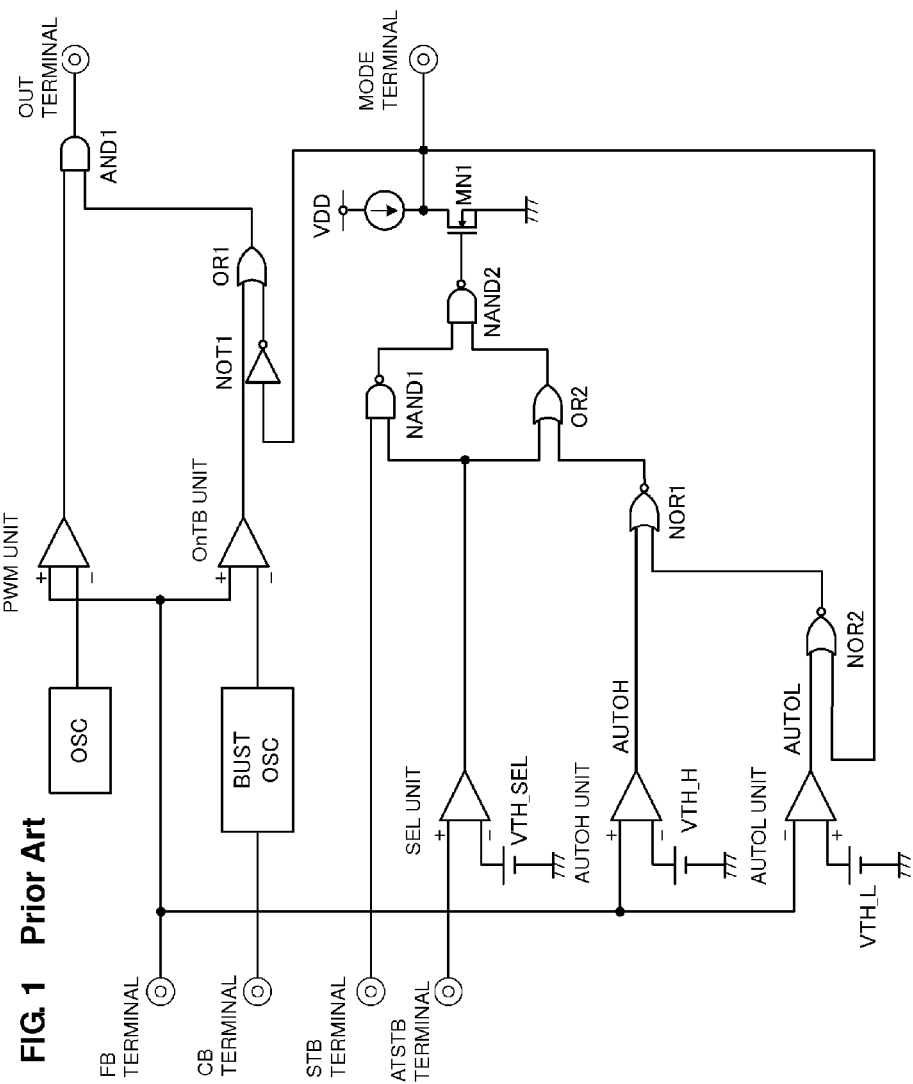
FIG. 1 is a circuit diagram of a switching power supply control IC illustrated in Japanese Unexamined Patent Application Publication No. 2007-14081.
Figure 2:
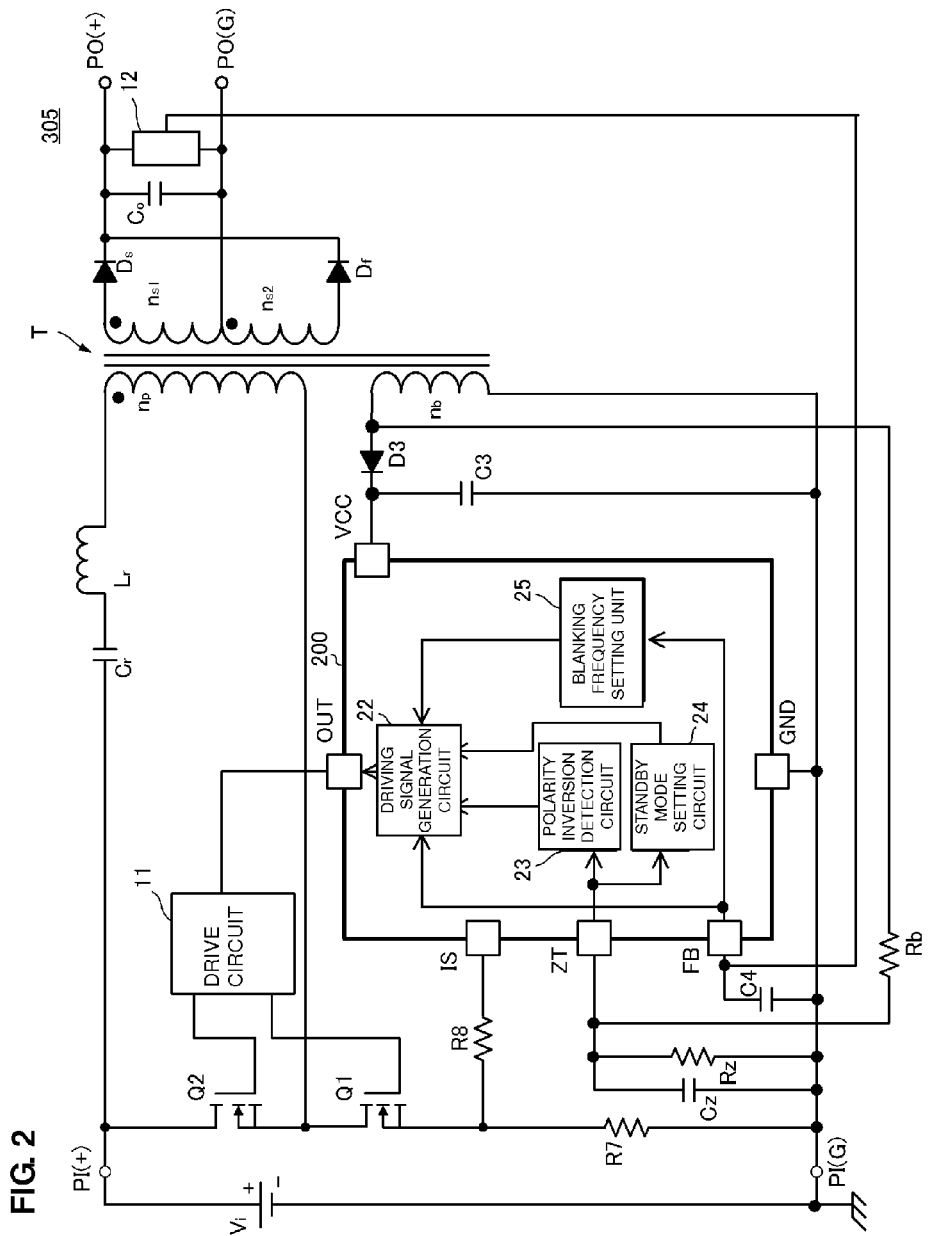
FIG. 2 is a circuit diagram of a switching power supply apparatus 305 according to a first preferred embodiment of the present invention.

FIG. 2 is the circuit diagram of a switching power supply apparatus 305 according to a first preferred embodiment of the present invention. The switching power supply apparatus 305 includes a switching control IC 200 corresponding to a switching control circuit of the present invention.

Between the input terminals PI(+) and PI(G) of the switching power supply apparatus 305, the voltage of a direct-current input power supply Vi is input. In addition, a predetermined direct-current voltage is output to a load connected between the output terminals PO(+) and PO(G) of the switching power supply apparatus 305.

Between the input terminals PI(+) and PI(G), a first series circuit is configured where a capacitor Cr, an inductor Lr, the primary winding np of a transformer T, a first switching element Q1, and a current detection resistor R7 are connected in series. A second switching element Q2 is connected in parallel to a series circuit including the capacitor Cr, the inductor Lr, and the primary winding np of the transformer T.

The first switching element Q1 includes an FET, the drain terminal thereof is connected to one end of the primary winding np of the transformer T, and the source terminal thereof is connected to one end of the current detection resistor R7. The second switching element Q2 includes an FET, the drain terminal thereof is connected to an input terminal Vin(+), the source terminal thereof is connected to the drain terminal of the first switching element Q1.

A first rectification smoothing circuit including diodes Ds and Df and a capacitor Co is configured in the secondary windings ns1 and ns2 of the transformer T. This first rectification smoothing circuit full-wave rectifies, smooths, and outputs an alternating-current voltage output from the secondary windings ns1 and ns2 to the output terminals PO(+) and PO(G).

A rectification smoothing circuit due to a diode D3 and a capacitor C3 is connected to the drive winding nb of the transformer T. A direct-current voltage obtained owing to the rectification smoothing circuit is supplied between the GND terminal and the VCC terminal of the switching control IC 200, as the power-supply voltage of the corresponding IC.

As described above, using the first and second switching elements Q1 and Q2, the capacitor Cr, the inductor Lr, the transformer T, the diodes Ds and Df, the capacitor Co, and the like, a power converter circuit is configured.

The switching control IC 200 outputs a rectangular wave signal from the OUT terminal thereof to a drive circuit 11. The drive circuit 11 alternately on-off controls the first switching element Q1 and the second switching element Q2. In this regard, however, a dead time period is set so that the Q1 and Q2 are not simultaneously turned on.

A resistor R8 is connected to the current detection terminal IS of the switching control IC 200 so that the falling voltage of the current detection resistor R7 is input.

Between the output terminals PO(+) and PO(G) and the switching control IC 200, a feedback circuit 12 is provided. This feedback circuit 12 is a circuit that generates a feedback signal by comparing the voltage-dividing value of a voltage between the output terminals PO(+) and PO(G) with a reference voltage and inputs, in an insulating state, a feedback voltage to the feedback terminal FB of the switching control IC 200.

The switching control IC 200 outputs a rectangular wave signal from the output terminal OUT, and turns on or off the first switching element Q1 and the second switching element Q2 through the drive circuit 11 at a switching frequency according to the load. Accordingly, the switching power supply apparatus 305 operates as a current resonant converter.

At the time of a normal operation when an overcurrent protection circuit does not operate, the switching control IC 200 detects an output voltage owing to the input signal of the feedback terminal FB, and controls the frequency and the pulse width of the rectangular wave signal output to the output terminal OUT so that the voltage becomes constant. Accordingly, the output voltage of the switching power supply apparatus 305 is stabilized.

The original function of the polarity detection terminal (zero-cross timing signal terminal) ZT of the switching control IC 200 is used for detecting that the polarity of a winding voltage of the transformer T has inverted. A signal input from the drive winding nb of the transformer T to the polarity detection terminal ZT is a rectangular wave shaped pulse. This signal is based on the polarity inversion of the winding voltage.

Between the polarity detection terminal ZT and the ground GND, an external circuit due to a capacitor Cz and a resistor Rz is connected. In addition, between the polarity detection terminal ZT and the drive winding nb, a resistor Rb is connected.

The peak value of a pulse voltage input to the polarity detection terminal ZT is defined on the basis of a turn ratio between the primary winding np and the drive winding nb of the transformer T and a voltage-dividing ratio between the resistors Rz and Rb.

Figure 3:
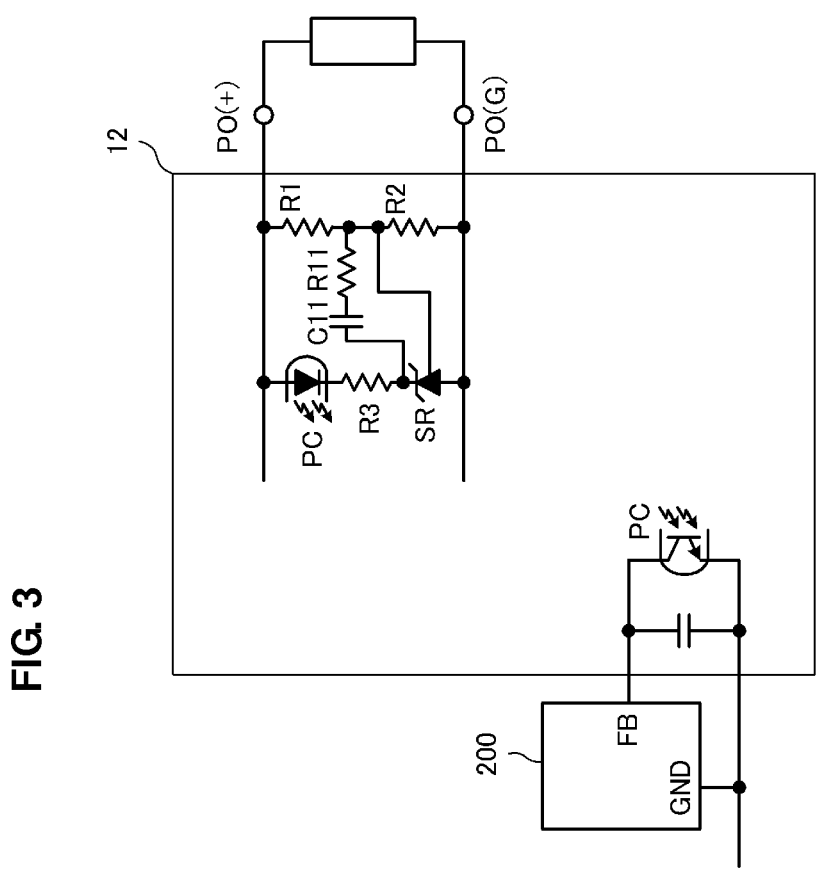
FIG. 3 is a circuit diagram of a feedback circuit 12.

FIG. 3 is the circuit diagram of the above-mentioned feedback circuit 12. Between the output terminals PO(+) and PO(G), a series circuit due to a shunt regulator SR, a resistor R3, and a light emitting element of a photo coupler PC and a voltage-dividing circuit due to resistors R1 and R2 are connected. A voltage-divided output of the resistance voltage-dividing circuit due to the above-mentioned R1 and R2 is applied to the reference terminal of the shunt regulator SR. In addition, between the voltage control end and the reference terminal of the shunt regulator SR, a negative feedback circuit including a resistor R11 and a capacitor C11 is provided. In addition, between the feedback terminal FB and the ground terminal GND of the switching control IC 200, the light receiving element of the photo coupler PC is connected. Within the switching control IC 200, a constant current circuit is connected to the feedback terminal FB.

Between the feedback terminal FB and the ground terminal of the switching control IC 200, a capacitor C4 is connected. The feedback circuit 12 functions in a relationship where the voltage of the feedback terminal FB decreases with the output voltage to the output terminals PO(+) and PO(G) becoming higher than a setting voltage.

A driving signal generation circuit 22 illustrated in FIG. 2 turns on or off the first switching element Q1 and the second switching element Q2 through the drive circuit 11 at a switching frequency according to the load. Accordingly, the switching power supply apparatus 305 operates as a current resonant converter. On the basis of a signal input to the polarity detection terminal ZT, a polarity inversion detection circuit 23 supplies, to the driving signal generation circuit 22, a timing signal for turning on or turning off the switching elements Q1 and Q2. A standby mode setting circuit 24 reads the signal of the polarity detection terminal ZT during a predetermined time period, and sets the on/off of a standby mode function.

A blanking frequency setting unit 25 is a circuit that controls the switching frequency by setting a time (blanking time) from when the switching elements Q1 and Q2 are turned on or off once till when the switching elements Q1 and Q2 are turned on or off subsequently. This blanking frequency setting unit 25 sets the maximum level of the switching frequency to, for example, 250 kHz, in a normal load state where the standby mode function is turned on.

Since the on-times of the switching elements Q1 and Q2 decrease with a decrease in the load, the switching frequency increases. However, since the blanking frequency setting unit 25 lengthens the blanking time when entering the standby mode, the switching frequency is forcibly reduced. Therefore, a switching loss at the time of a light load is reduced.

Figure 4:
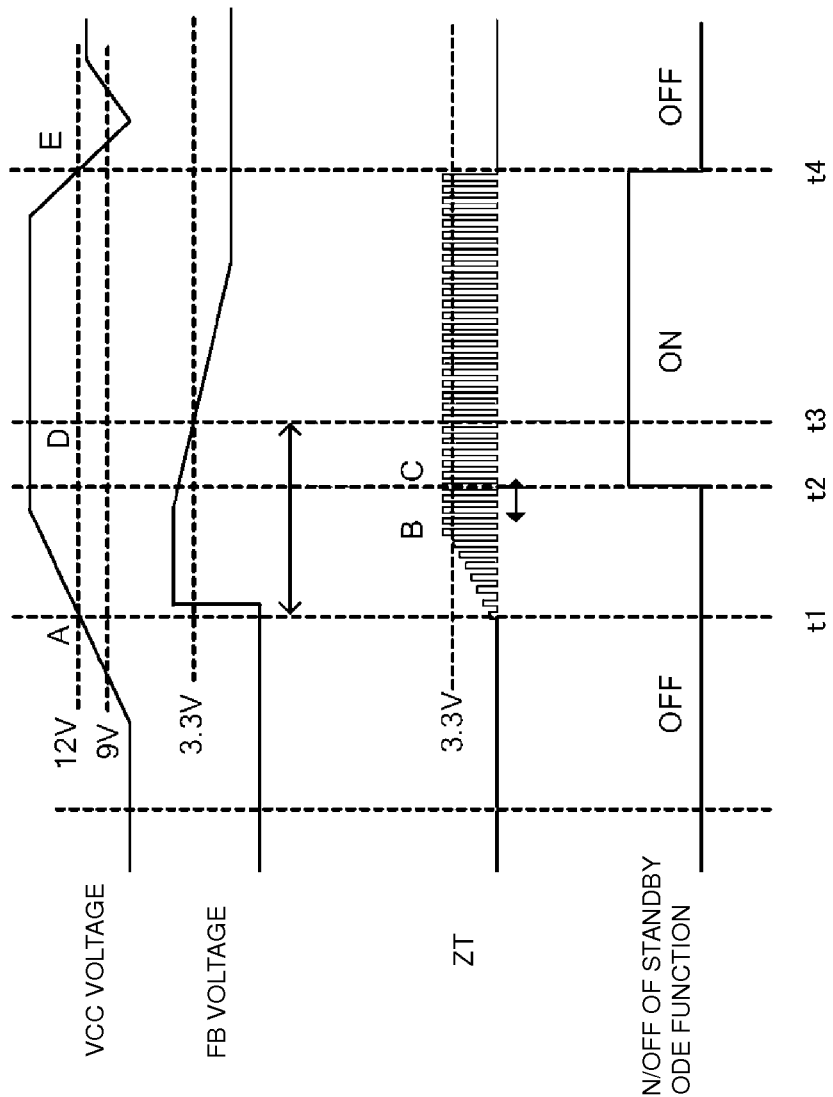
FIG. 4 is a diagram illustrating a relationship among voltage waveforms of a power supply terminal VCC, a feedback terminal FB, and a polarity detection terminal ZT in a switching control IC 200 and on/off of a standby mode function.

FIG. 4 is a diagram illustrating a relationship among the voltage waveforms of a power supply terminal VCC, the feedback terminal FB, and the polarity detection terminal ZT in the switching control IC 200 and the on/off of the standby mode function.

The switching control IC 200 has a function of transiting to the standby mode, with regarding as being in a standby state (light load state) when the voltage of the feedback terminal FB is lower than 1.0 V, and reducing the switching frequency. In addition, the switching control IC 200 performs the switching of the on/off of the function of the standby mode in response to the signal of the polarity detection terminal ZT in a predetermined detection time period.

UVLO (Under Voltage Lock Out) is cancelled at a time (t1) when the voltage of the power supply terminal VCC has exceeded 12 V, and from the time t1, the number of pulses where the voltage of the polarity detection terminal ZT exceeds a setting voltage 3.3 V is detected. At a time (t2) when the number of pulses has exceeded the set number of pulses "4", the standby mode function is turned on.

A detection time period is from the above-mentioned t1 to a time t3 when the voltage of the feedback terminal FB falls below 3.3 V. When the number of pulses where the voltage of the polarity detection terminal ZT exceeds 3.3 V does not reach 4 within this detection time period, the standby mode function remains turned off.

After that, at a time t4 when the voltage of the power supply terminal VCC falls below 12 V (a time when UVLO is detected), the standby mode function is turned off.

In addition, as for the detection of the power-supply voltage, performed on the switching control IC 200, in addition to directly detecting the voltage of the power supply terminal VCC, the detection may also be performed by inputting the voltage-divided voltage of the power-supply voltage to a BO (Brown-out) terminal serving as a low-voltage detecting terminal and comparing the voltage of the BO terminal with a threshold value.

Second Preferred Embodiment

Figure 5:
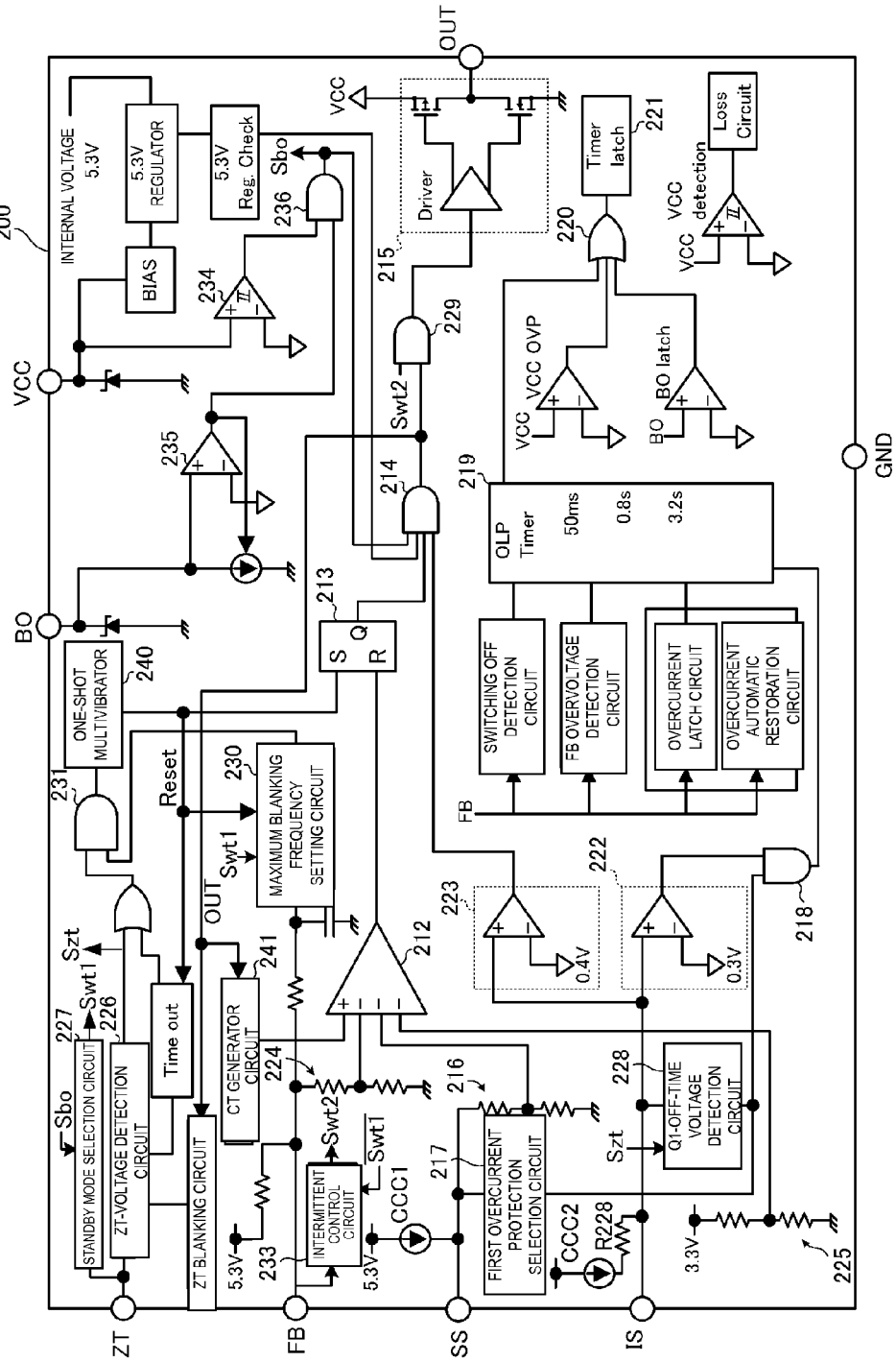
FIG. 5 is a diagram illustrating an internal configuration of the switching control IC 200 included in a switching power supply circuit according to a second preferred embodiment with dividing the switching control IC 200 into blocks.

FIG. 5 is a diagram illustrating the internal configuration of the switching control IC 200 included in a switching power supply circuit according to a second preferred embodiment with dividing the switching control IC 200 into blocks. The switching power supply circuit of the second preferred embodiment has a first standby mode and a second standby mode, and is capable of selecting one thereof. In FIG. 5, a maximum blanking frequency setting circuit 230 sets a maximum blanking frequency in response to the voltage of the feedback terminal FB when the first standby mode function is turned on. In addition, the maximum blanking frequency setting circuit 230 reads the voltage of the feedback terminal FB when the switching power supply circuit is activated.

While a ZT-voltage detection circuit 226 detects a pulse voltage input to a ZT terminal, and supplies a trigger to a one-shot multivibrator 240 by detecting the inversion of the voltage of the drive winding nb in the transformer T, the maximum blanking frequency setting circuit 230 puts the output thereof into a low level, and hence, the output of an AND gate 231 becomes a low level and a blanking time when an OUT terminal maintains a low level is determined. As a result, the switching frequency is determined.

When the voltage of the ZT terminal has reached a threshold value (for example, 3.3 V) in a detection time period at the time of the activation of the switching power supply circuit, a standby mode selection circuit 227 validates a signal Swt1 to the maximum blanking frequency setting circuit 230. This causes the first standby mode to be validated.

A hysteresis comparator 234 is connected to the power supply terminal VCC in FIG. 5. In addition, a comparator 235 is connected to the Brown-out terminal BO. An AND gate 236 is connected to the outputs of the hysteresis comparator 234 and the comparator 235. An output signal Sbo of this AND gate 236 is input to the standby mode selection circuit 227. A voltage obtained by voltage-dividing the power-supply voltage supplied to the switching control IC 200 is input to the Brown-out terminal BO.

When the signal Sbo is at a high level, the AND gate 214 is validated, and the output signal of a flip-flop 213 is supplied to a drive circuit 215. In other words, when the above-mentioned signal Sbo has changed from a low level to a high level, the switching control circuit 200 starts operating, and when the signal Sbo has become a low level, the switching control circuit 200 stops operating.

A time period from when the above-mentioned signal Sbo has become a high level till when the voltage of the feedback terminal FB falls below a predetermined threshold value is the detection time period. This corresponds to a time period from the t1 to the t3, illustrated in FIG. 4. When the above-mentioned signal Sbo has become a low level, the standby mode selection circuit 227 invalidates the first standby mode (validates the second standby mode), regardless of the voltage of the polarity detection terminal ZT.

In addition, the illustration of a circuit portion that compares the voltage of the feedback terminal FB with the threshold value and inputs the result thereof to the standby mode selection circuit 227 is omitted in FIG. 5.

While the above-mentioned Brown-out terminal BO is a terminal used for detecting a decrease in a detection target voltage, by inputting the divided voltage of the power-supply voltage of the switching control IC 200 to the terminal BO, it is possible to detect the timing of the t1 illustrated in FIG. 4, using the BO terminal, in addition to the power supply terminal VCC.

Figure 6:
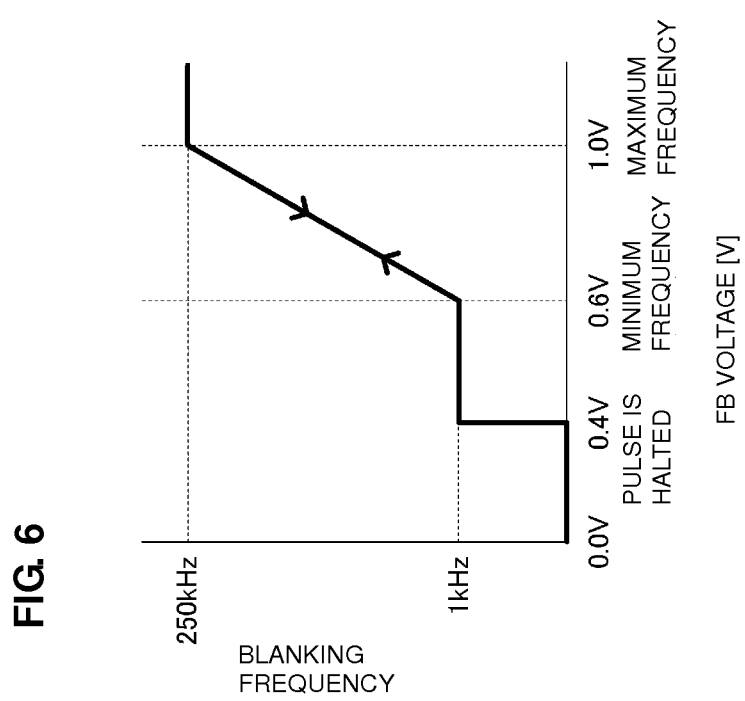
FIG. 6 is a diagram illustrating a relationship between a voltage of an FB terminal and a blanking frequency when a first standby mode is selected.

FIG. 6 is a diagram illustrating a relationship between the voltage of the above-mentioned feedback terminal FB and the blanking frequency when the first standby mode is selected. In this example, when the voltage of the terminal FB is lower than 0.4 V (in a no-load state or a state near thereto), the switching operation is halted. During an interval when the voltage of the terminal FB is from 0.4 V to 0.6 V, an operation is performed with the switching frequency of 1 kHz, and during an interval when the voltage of the terminal FB is from 0.6 V to 1.0 V, the switching frequency linearly changes. When the voltage of the FB terminal is higher than 1.0 V (in a normal load state), the maximum blanking frequency becomes, for example, 250 kHz.

In FIG. 5, when the voltage of the feedback terminal FB is less than or equal to 1 V, the blanking frequency determined owing to the blanking time is set by the maximum blanking frequency setting circuit 230 so as to change linearly from 250 kHz to 1 kHz with respect to the change of the voltage of the feedback terminal FB from 1 V to 0.4 V. Therefore, the load is lightened, the switching frequency decreases with a decrease in the voltage of the feedback terminal FB, and the standby mode is set that reduces the switching frequency. Accordingly, it is possible to respond to loss reduction in the light load.

On the other hand, when the second standby mode function is validated (the first standby mode is invalidated), the following operation is performed.

When the signal Swt1 is invalidated and the voltage of the feedback terminal FB falls below a predetermined threshold value, the intermittent control circuit 233 illustrated in FIG. 5 puts the output of an AND gate 229 into a low level by putting a control signal Swt2 into a low level, and halts an output signal from the OUT terminal. In other words, the switching of the switching element is halted. Since this causes a load supply voltage to gradually decrease, the voltage of the feedback terminal FB increases along with this, and the intermittent control circuit 233 returns the control signal Swt2 to a high level. In this way, in the light load, an intermittent oscillation operation is performed.

With respect to the change of the voltage of the feedback terminal FB from 1 V to 0.4 V, a ratio between an oscillation time period where oscillation is continued and a halt time period where a switching operation is halted is changed, and the percentage of the oscillation time period is linearly changed from 1 to 0. Therefore, as the load becomes light and the voltage of the feedback terminal FB decreases, the percentage of the oscillation time period decreases, and the intermittent oscillation operation is set. The mode of this intermittent oscillation operation is the second standby mode.

Third Preferred Embodiment

Figure 7:
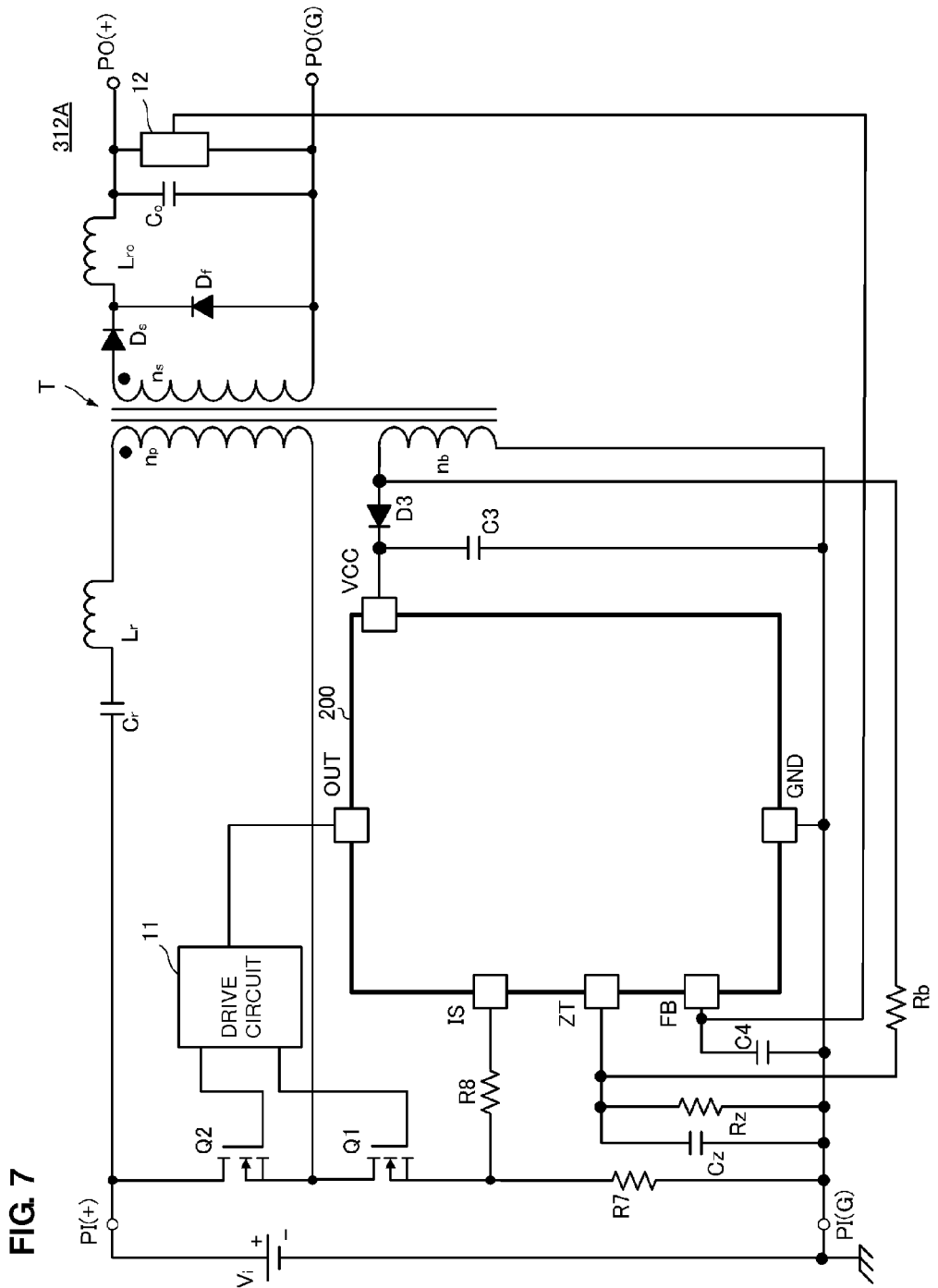
FIG. 7 is a circuit diagram of a switching power supply apparatus 312A according to a third preferred embodiment.
Figure 8:
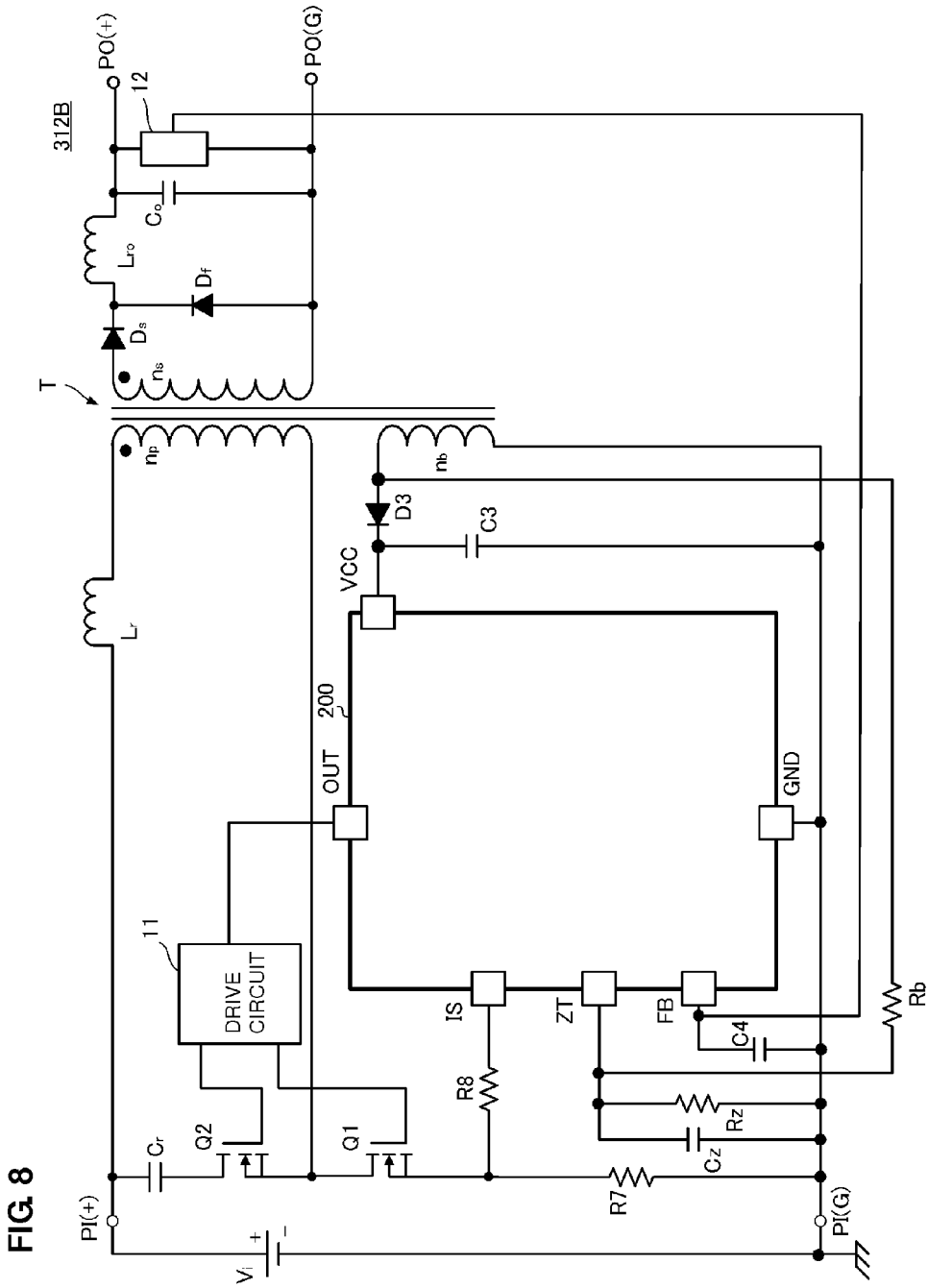
FIG. 8 is a circuit diagram of a switching power supply apparatus 312B according to the third preferred embodiment.

FIG. 7 and FIG. 8 are the circuit diagrams of switching power supply apparatuses 312A and 312B according to a third preferred embodiment. Each of the switching power supply apparatuses 312A and 312B includes the switching control IC 200 corresponding to the switching control circuit of the present invention. In each of the switching power supply apparatuses 312A and 312B, the secondary side of the transformer T is a forward type. The connection position of the resonance capacitor Cr on a primary side is different between FIG. 7 and FIG. 8.

In this way, by providing a rectification smoothing circuit due to the diodes Ds and Df, an inductor Lro, and the capacitor Co on the secondary side of the transformer T, a forward method may also be adopted.

In addition, since it is only necessary for the resonance capacitor Cr on the primary side to be inserted in series in a closed loop formed when the switching element Q2 on a high side is turned on, the capacitor Cr may also be connected in series to the drain of the switching element Q2 as illustrated in FIG. 8.

The other configurations are the same as those illustrated in the first preferred embodiment, and the same function effects are achieved.

Fourth Preferred Embodiment

Figure 9:
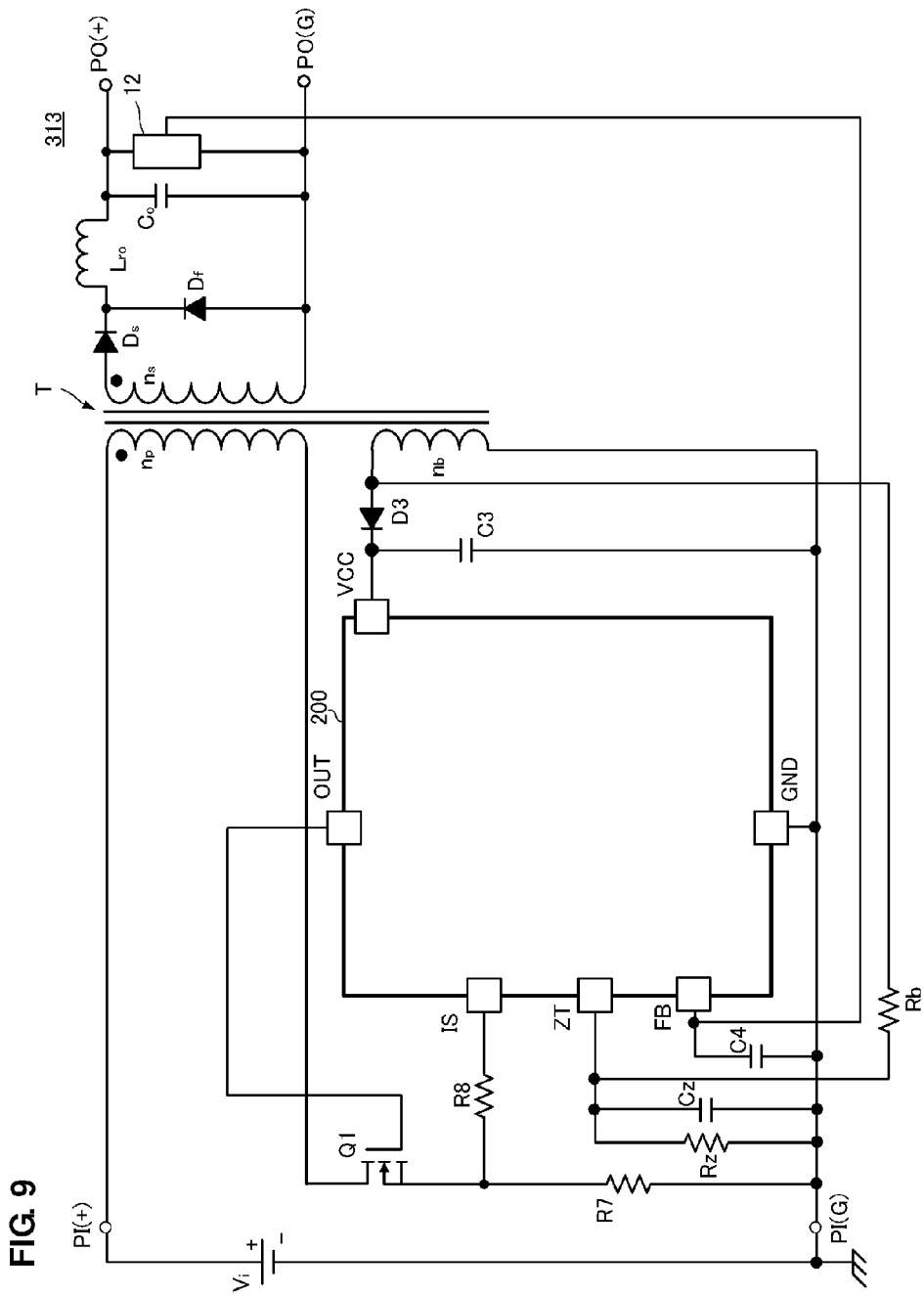
FIG. 9 is a circuit diagram of a switching power supply apparatus 313 according to a fourth preferred embodiment.

FIG. 9 is the circuit diagram of a switching power supply apparatus 313 according to a fourth preferred embodiment. The switching power supply apparatus 313 includes the switching control IC 200 corresponding to the switching control circuit of the present invention. In the switching power supply apparatus 313, the secondary side of the transformer T is a forward type.

The switching power supply apparatus 313 is different from the switching power supply apparatus 305 illustrated in FIG. 2 in that a simple forward converter is configured without the inductor Lr, the capacitor Cr, and the second switching element Q2 being provided.

In this way, it is also possible to be applied to the simple forward converter and the same function effect is achieved.

Fifth Preferred Embodiment

Figure 10:
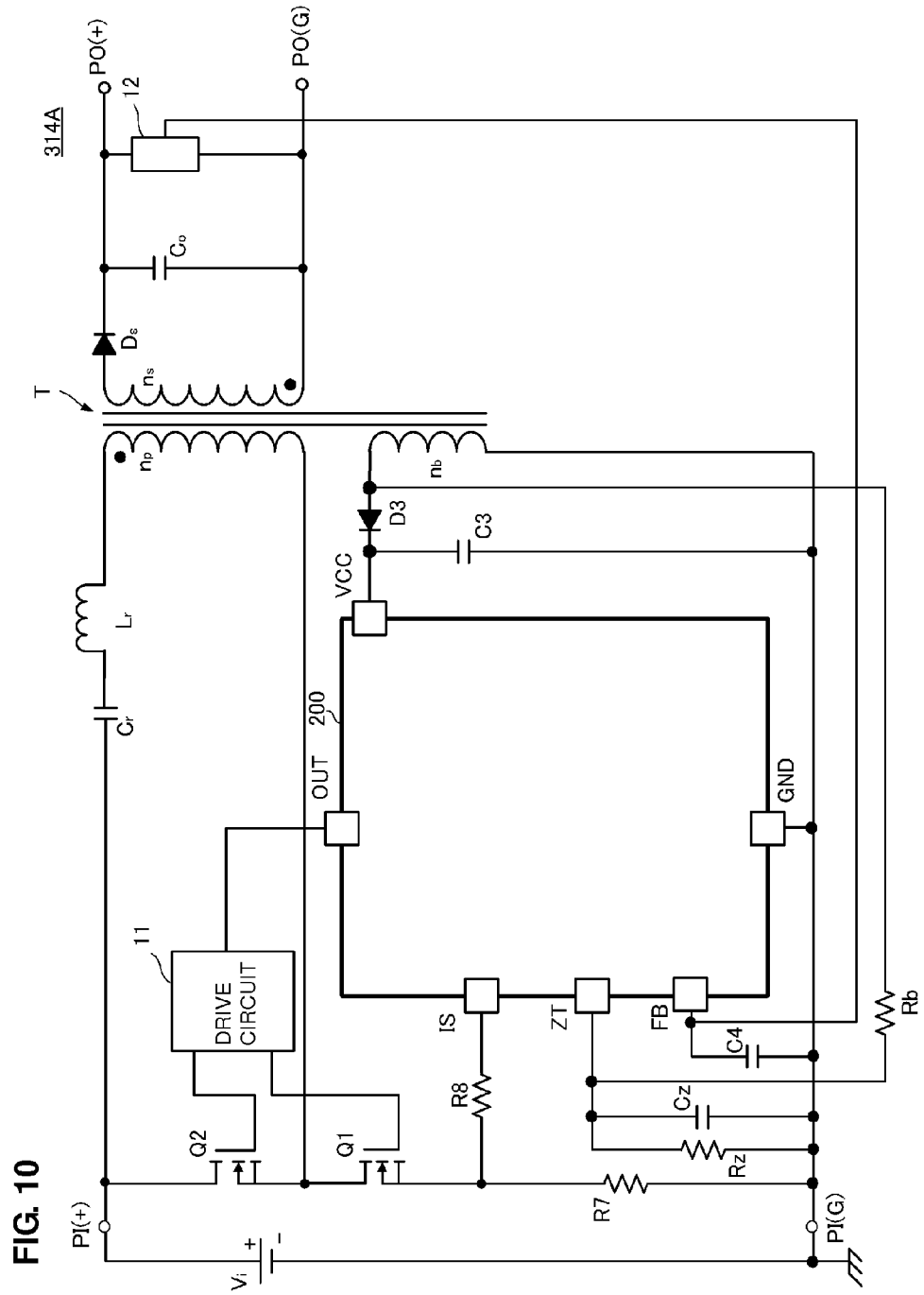
FIG. 10 is a circuit diagram of a switching power supply apparatus 314A according to a fifth preferred embodiment.
Figure 11:
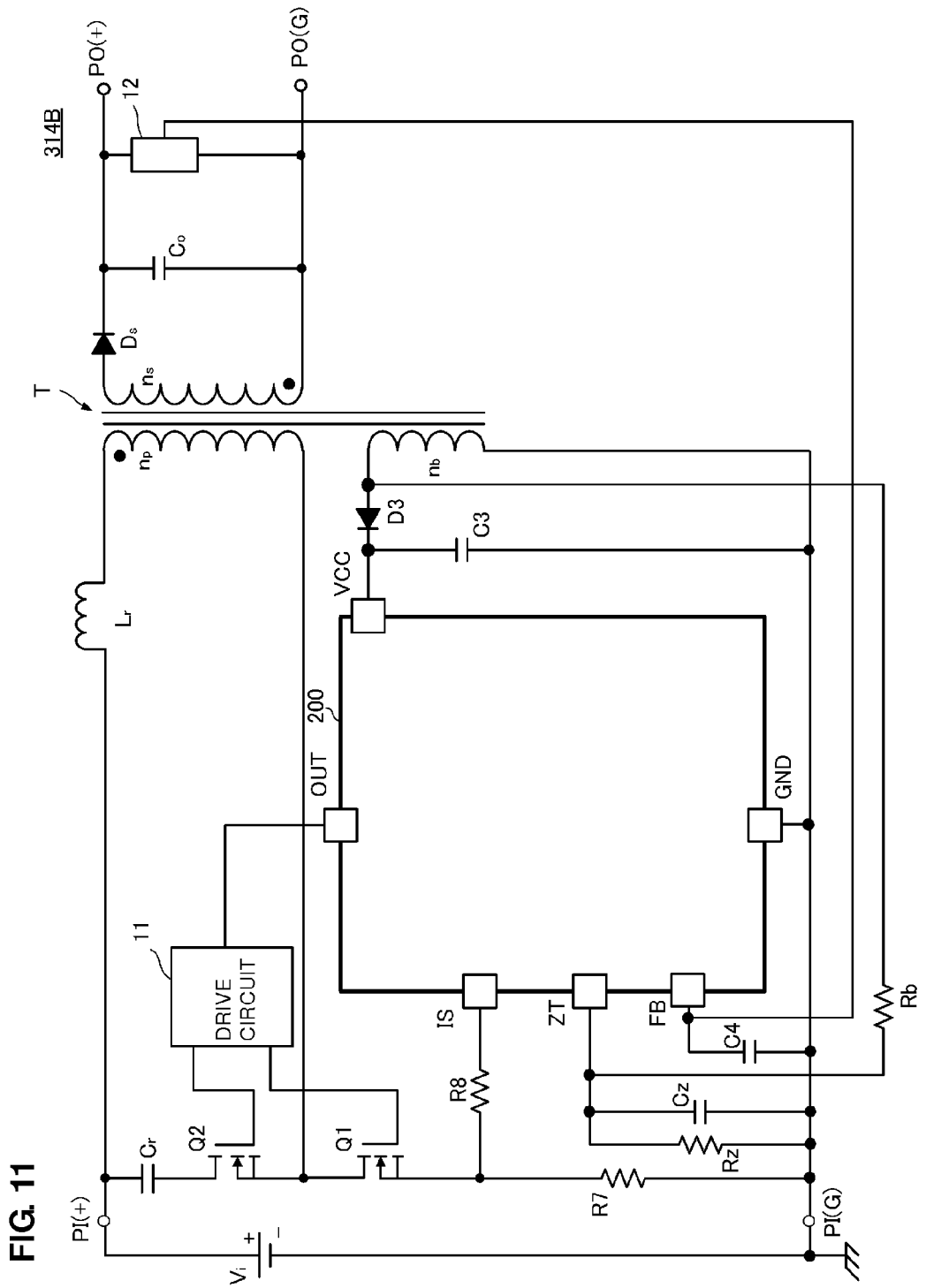
FIG. 11 is a circuit diagram of a switching power supply apparatus 314B according to the fifth preferred embodiment.

FIG. 10 and FIG. 11 are the circuit diagrams of switching power supply apparatuses 314A and 314B according to a fifth preferred embodiment. Each of the switching power supply apparatuses 314A and 314B includes the switching control IC 200 corresponding to the switching control circuit of the present invention. In each of the switching power supply apparatuses 314A and 314B, the secondary side of the transformer T is a flyback type. The connection position of the resonance capacitor Cr on a primary side is different between FIG. 10 and FIG. 11.

In this way, by providing a rectification smoothing circuit due to the diode Ds and the capacitor Co on the secondary side of the transformer T, a flyback method may also be adopted.

In addition, since it is only necessary for the resonance capacitor Cr on the primary side to be inserted in series in a closed loop formed when the switching element Q2 on a high side is turned on, the capacitor Cr may also be connected in series to the drain of the switching element Q2 as illustrated in FIG. 11.

The other configurations are the same as those illustrated in the first preferred embodiment, and the same function effects are achieved.

Sixth Preferred Embodiment

Figure 12:
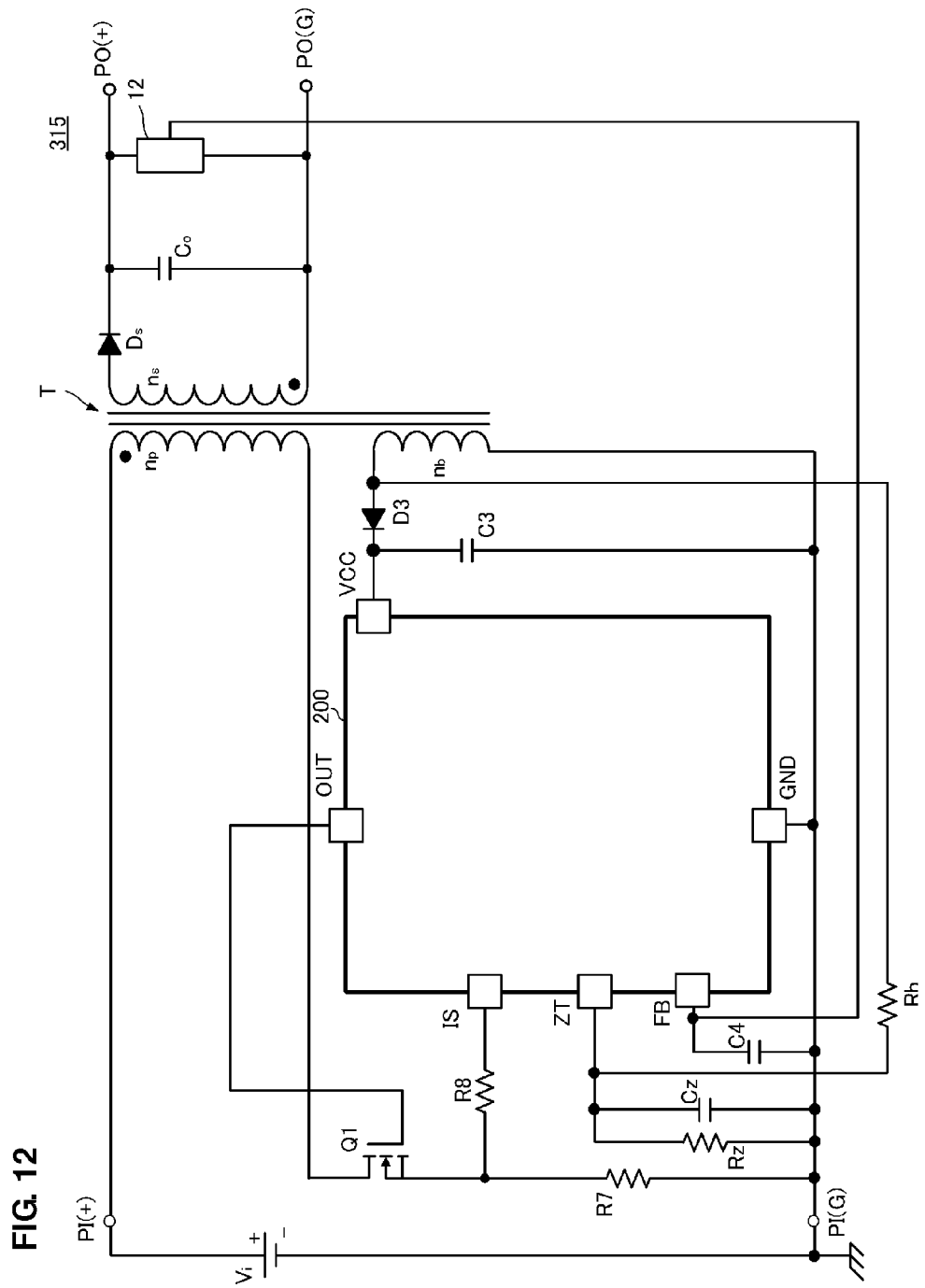
FIG. 12 is a circuit diagram of a switching power supply apparatus 315 according to a sixth preferred embodiment.

FIG. 12 is the circuit diagram of a switching power supply apparatus 315 according to a sixth preferred embodiment. The switching power supply apparatus 315 includes the switching control IC 200 corresponding to the switching control circuit of the present invention. In the switching power supply apparatus 315, the secondary side of the transformer T is a flyback type.

The switching power supply apparatus 315 is different from the switching power supply apparatus 314A illustrated in FIG. 10 in that a simple flyback converter is configured without the inductor Lr, the capacitor Cr, and the second switching element Q2 being provided.

In this way, it is also possible to be applied to the simple flyback converter and the same function effect is achieved.

Seventh Preferred Embodiment

Figure 13:
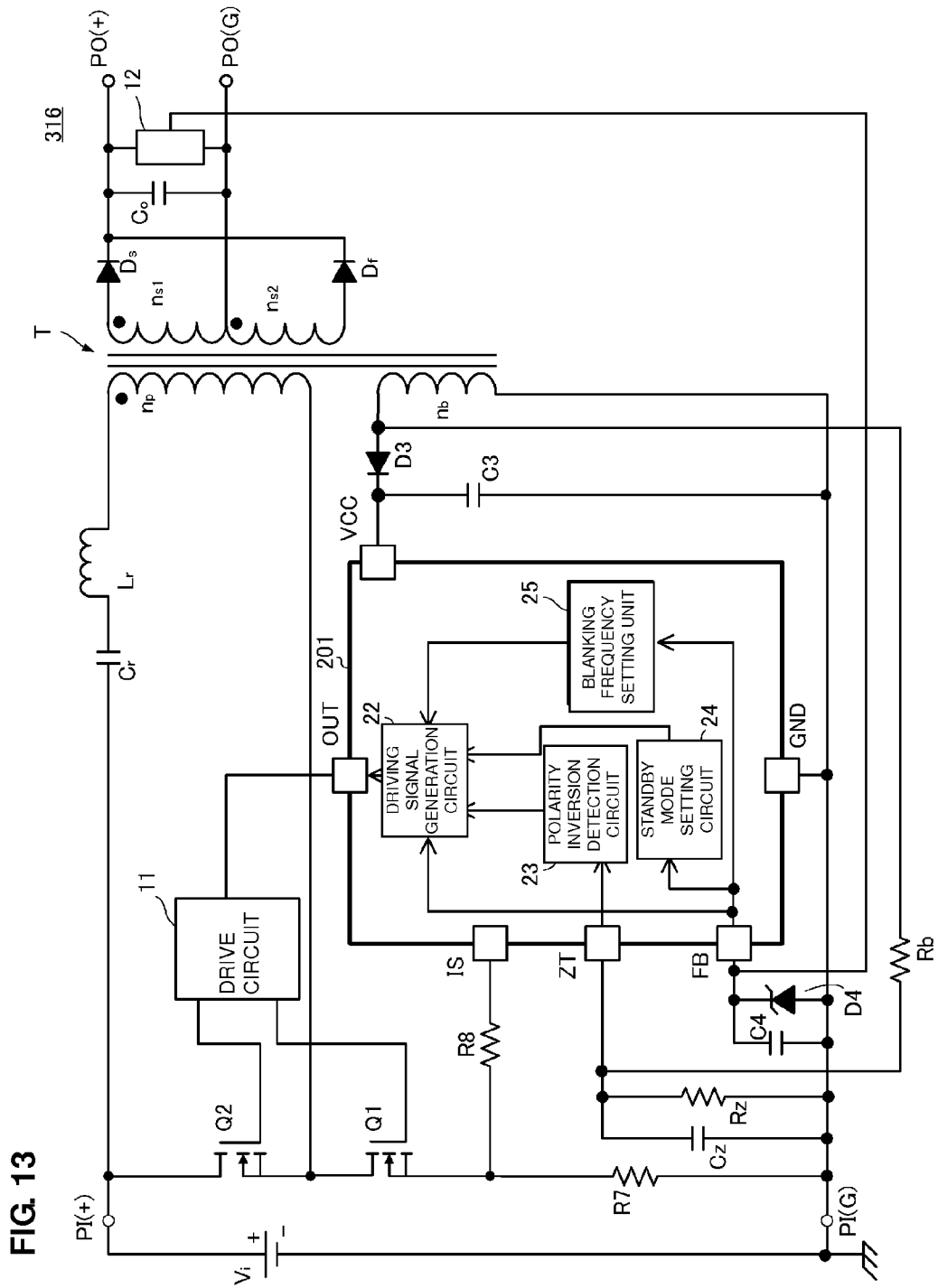
FIG. 13 is a circuit diagram of a switching power supply apparatus 316 according to a seventh preferred embodiment.

FIG. 13 is the circuit diagram of a switching power supply apparatus 316 according to a seventh preferred embodiment of the present invention. In the first to sixth preferred embodiments, the validity/invalidity of the standby mode or the type of the standby mode is set on the basis of the voltage of the polarity detection terminal ZT or the number of pulses. On the other hand, in the seventh preferred embodiment, on the basis of the voltage of the feedback terminal FB, the validity/invalidity of the standby mode or the type of the standby mode is set.

The capacitor C4 and a zener diode D4 are connected between the feedback terminal FB and the ground terminal of a switching control IC 201. The zener diode D4 is an external circuit selectively connected. A configuration other than that is the same as that illustrated in FIG. 2 in the first preferred embodiment.

The feedback circuit 12 functions in a relationship where the voltage of the feedback terminal FB decreases with the output voltage to the output terminals PO(+) and PO(G) becoming higher than a setting voltage. The voltage waveform of the feedback terminal FB at the time of activation is as illustrated in FIG. 4. Since, at the start of the activation of the switching power supply apparatus 316, an output voltage does not reach a specified value, the voltage of the feedback terminal FB is clamped by the zener voltage of the zener diode D4 while trying to reach a maximum value. As illustrated in FIG. 4, the voltage of the feedback terminal FB becomes a maximum value after a given length of time has elapsed from the time (t1) when the voltage of the power supply terminal VCC exceeded 12 V. On the basis of whether or not the voltage of the maximum value exceeds a predetermined threshold value, the standby mode setting circuit 24 illustrated in FIG. 13 sets the validity/invalidity of the standby mode. In this way, owing to the zener voltage of the zener diode D4 connected to the feedback terminal FB, it is possible to set the validity/invalidity of the standby mode.

Another Preferred Embodiment

The converter method of the switching power supply apparatus of the present invention is not limited to an insulated converter, and may also be a non-insulated converter. In addition, without being limited to a half-bridge type, it is also possible to be applied to a full-bridge type or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching control circuit comprising:
 a semiconductor integrated circuit configured to include a plurality of external terminals and be provided in a power converter circuit of a switching power supply apparatus to control a switching element; wherein
 the plurality of external terminals include a polarity detection terminal, into which a polarity inversion timing signal indicating a change in a polarity of a current flowing through or a voltage generated in an inductor or a transformer of the power converter circuit due to an operation of the switching control circuit is input, and a feedback terminal into which a feedback signal used to detect and control an output voltage obtained due to an operation of the switching control circuit is input;

the switching control circuit includes:
  a switching element control mechanism configured to perform switching control of the switching element on the basis of a signal of the polarity detection terminal and a voltage of the feedback terminal;
  a control mode switching mechanism configured to switch between a control mode of the switching element when a load of the power converter circuit is in a standby state and a control mode of the switching element when the load is in a normal load state; and
  a standby mode setting mechanism configured to, when a power supply voltage input to the switching control circuit has exceeded a predetermined value, start to detect, as a determination target signal, a voltage induced in an external circuit that is connected to the polarity detection terminal or the feedback terminal and includes at least a resistance element or a semiconductor element, and set a validity/invalidity of a control mode that is switched when the control mode switching mechanism is in the standby state or set a type of a control mode in a standby state, in response to the determination target signal in a predetermined detection time period in which the determination target signal is detected.

2. The switching control circuit according to claim 1, wherein
the switching element control mechanism forcibly sets a switching frequency of the switching element lower than a switching frequency in the normal load state, in the control mode in the standby state.

3. The switching control circuit according to claim 2, wherein
the switching element control mechanism restricts a maximum level of the switching frequency in the control mode in the normal load state.

4. The switching control circuit according to claim 1, wherein
the switching element control mechanism performs intermittent oscillation driving where an oscillation time period and a halt time period in the switching element is alternately repeated in the control mode in the standby state.

5. The switching control circuit according to claim 1, wherein
the standby mode setting mechanism sets the validity/invalidity of the control mode in the standby state or the type of the control mode in the standby state by comparing a voltage of the polarity detection terminal with a threshold voltage in the detection time period.

6. The switching control circuit according to claim 1, wherein
the standby mode setting mechanism sets the validity/invalidity of the control mode in the standby state or the type of the control mode in the standby state by comparing a voltage of the feedback terminal with a threshold voltage in the detection time period.

7. The switching control circuit according to claim 1, wherein
the standby mode setting mechanism sets the validity/invalidity of the control mode in the standby state or the type of the control mode in the standby state on the basis of the number of pulses that are greater than or equal to a predetermined voltage and occur in the polarity detection terminal in a detection time period.

8. The switching control circuit according to claim 1, wherein
start of the detection time period is a time when a power-supply voltage input to the switching control circuit becomes greater than or equal to a predetermined voltage and the switching element control mechanism starts outputting a control signal.

9. The switching control circuit according to claim 1, wherein
termination of the detection time period is a time when the voltage of the feedback terminal becomes less than or equal to a predetermined voltage.

10. The switching control circuit according to claim 1, wherein
the control mode switching mechanism detects that a power-supply voltage input to the switching control circuit has become less than a predetermined voltage, and cancels setting of the control mode in the standby state.

11. The switching control circuit according to claim 1, wherein
the plurality of external terminals include a control terminal into which a control signal to start or halt the operation of the switching control circuit, and
the control mode switching mechanism detects that a voltage of the control terminal has become a voltage to halt the operation of the switching control circuit, and cancels setting of the control mode in the standby state.

12. A switching power supply apparatus where the switching control circuit according to claim 1 is provided in the power converter circuit.

* * * * *